United States Patent
Noda et al.

(10) Patent No.: US 12,352,015 B2
(45) Date of Patent: Jul. 8, 2025

(54) SYSTEM FOR SETTING TARGET TRAJECTORY OF ATTACHMENT

(71) Applicant: KOBELCO CONSTRUCTION MACHINERY CO., LTD., Hiroshima (JP)

(72) Inventors: Daisuke Noda, Hiroshima (JP); Koji Yamashita, Hiroshima (JP); Masaki Akiyama, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 244 days.

(21) Appl. No.: 18/041,248

(22) PCT Filed: Aug. 5, 2021

(86) PCT No.: PCT/JP2021/029072
§ 371 (c)(1),
(2) Date: Feb. 10, 2023

(87) PCT Pub. No.: WO2022/049987
PCT Pub. Date: Mar. 10, 2022

(65) Prior Publication Data
US 2023/0304264 A1    Sep. 28, 2023

(30) Foreign Application Priority Data

Sep. 1, 2020   (JP) ................... 2020-147032

(51) Int. Cl.
*E02F 9/26*     (2006.01)
*E02F 3/43*     (2006.01)
(Continued)

(52) U.S. Cl.
CPC .............. *E02F 9/262* (2013.01); *E02F 3/435* (2013.01); *E02F 9/205* (2013.01); *G06V 20/58* (2022.01);
(Continued)

(58) Field of Classification Search
None
See application file for complete search history.

(56) References Cited

U.S. PATENT DOCUMENTS

2017/0101761 A1    4/2017  Wu
2018/0305902 A1*  10/2018  Tsukamoto ............. E02F 3/439
(Continued)

FOREIGN PATENT DOCUMENTS

JP    62-21 4407 A    9/1987
JP    2016-89389 A    5/2016
(Continued)

OTHER PUBLICATIONS

International Search Report issued Oct. 19, 2021 in PCT/JP2021/029072 filed on Aug. 5, 2021, 3 pages.
(Continued)

*Primary Examiner* — Peter D Nolan
*Assistant Examiner* — Jacob Kent Besteman-Street
(74) *Attorney, Agent, or Firm* — Oblon, McClelland, Maier & Neustadt, L.L.P.

(57) ABSTRACT

An attachment target locus setting system for efficiently operating an attachment is provided. The system includes a target locus setting part that sets a target locus for a specific portion of the attachment from a target start point being a target point where the attachment starts an operation to a target finish point being a target point where the attachment finishes the operation, an image capturing device that captures a periphery around the target finish point as peripheral information, a finish point shifting part that shifts, on the
(Continued)

basis of the peripheral information, the target finish point, and a target locus resetting part that resets the target locus to a target locus in a range from the target start point to a target finish point having been shifted.

5 Claims, 7 Drawing Sheets

(51) Int. Cl.
 *E02F 9/20* (2006.01)
 *G06V 20/58* (2022.01)
 *G06F 3/04847* (2022.01)
 *G06F 3/0488* (2022.01)
(52) U.S. Cl.
 CPC ........ *G06F 3/04847* (2013.01); *G06F 3/0488* (2013.01)

(56) References Cited

U.S. PATENT DOCUMENTS

| | | |
|---|---|---|
| 2018/0363270 A1 | 12/2018 | Wu |
| 2020/0181881 A1 | 6/2020 | Graves |
| 2020/0354921 A1 | 11/2020 | Nishi |
| 2020/0407949 A1 | 12/2020 | Aizawa et al. |
| 2021/0002851 A1 | 1/2021 | Morita |
| 2021/0002852 A1 * | 1/2021 | Nishi .................... E02F 9/2282 |
| 2021/0156114 A1 | 5/2021 | Saigo et al. |
| 2021/0198865 A1 | 7/2021 | Wu |

FOREIGN PATENT DOCUMENTS

| | | | |
|---|---|---|---|
| JP | 2019-35326 A | 3/2019 | |
| JP | 2019-190234 A | 10/2019 | |
| JP | 2020-20153 A | 2/2020 | |
| JP | 7383599 B2 * | 11/2023 | .............. E02F 3/434 |
| WO | WO 2019/151335 A1 | 8/2019 | |
| WO | WO 2019/181872 A1 | 9/2019 | |
| WO | WO 2019/189013 A1 | 10/2019 | |

OTHER PUBLICATIONS

Extended European Search Report issued Nov. 24, 2023 in European Patent Application No. 21864045.6, 7 pages.

* cited by examiner

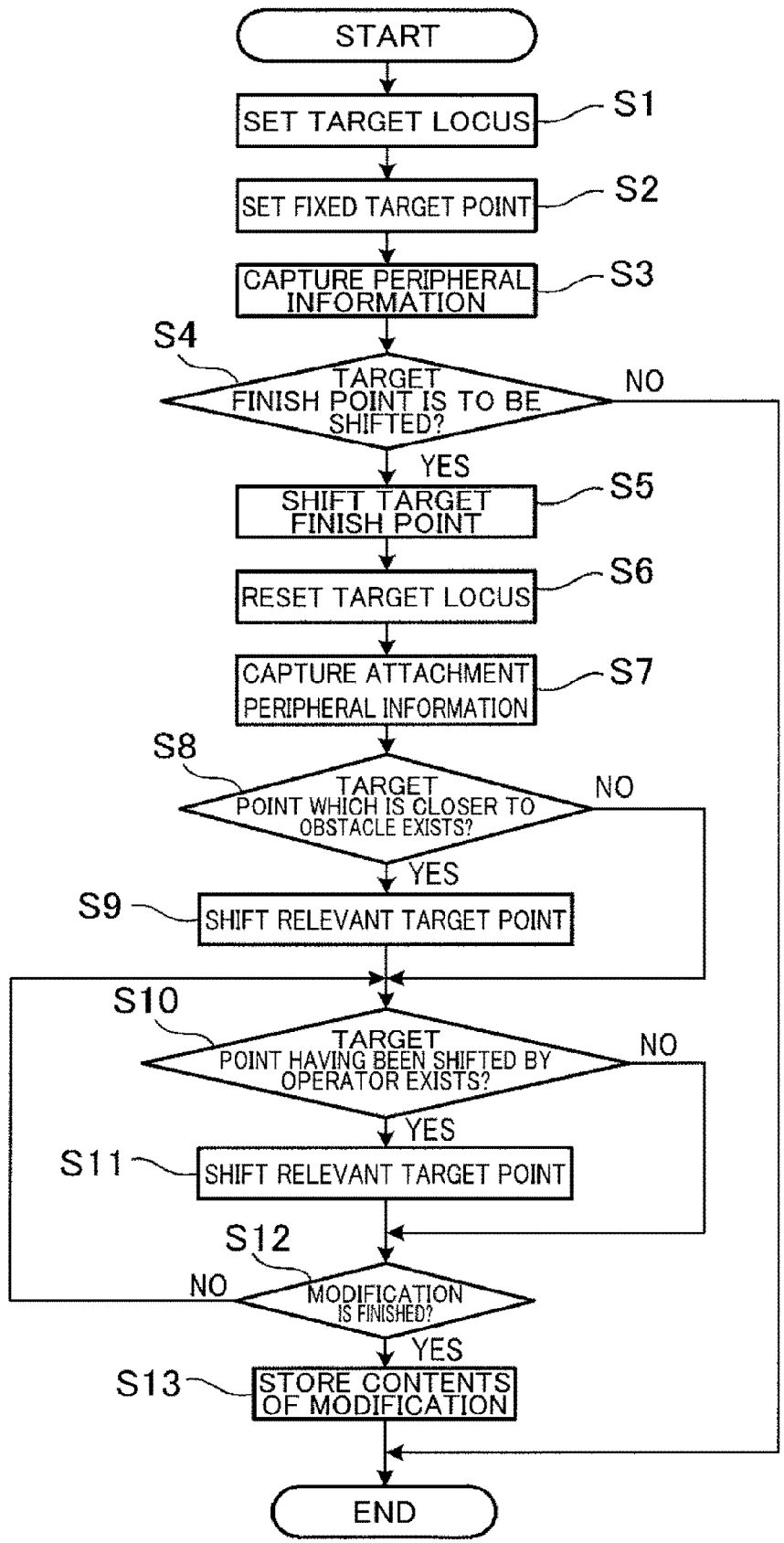

SYSTEM FOR SETTING TARGET TRAJECTORY OF ATTACHMENT

TECHNICAL FIELD

The present invention relates to an attachment target locus setting system which sets a target locus for a specific portion of an attachment included in a working machine.

BACKGROUND ART

As disclosed in Patent Literature 1, conventionally, a target posture of an attachment of a hydraulic excavator in a range from a soil discharge point to an excavation point is preliminarily taught, and the target posture is sequentially read out to permit the attachment to automatically operate.

Further, Patent Literature 2 discloses a technology of controlling an attachment on the basis of posture information about the attachment and information about a current shape or contour of a ground surface.

CITATION LIST

Patent Literature
  Patent Literature 1: Japanese Unexamined Patent Publication SHO 62-214407
  Patent Literature 2: Japanese Unexamined Patent Publication No. 2019-35326

Meanwhile, a shape or contour of an excavation target changes every moment on a work site due to accumulation of soil at an excavation point set for a start of excavation. The change causes a drawback of work inefficiency attributed to failure to reach the excavation point by the attachment in an operation of the attachment based on the taught content.

SUMMARY OF INVENTION

An object of the present invention is to provide an attachment target locus setting system for permitting an attachment to efficiently operate.

Provided by the present invention is an attachment target locus setting system for use in a working machine including a lower traveling body, an upper slewing body slewably attached onto the lower traveling body, and an attachment attached to the upper slewing body. The target locus setting system includes a target locus setting part, an image capturing device, a finish point shifting part, and a target locus resetting part. The target locus setting part sets a target start point being a start point for a specific portion of the attachment in a specific operation to be executed by the attachment, a target finish point being a finish point for the specific portion in the specific operation, and a target locus being a locus for the specific portion from the target start point to the finish point. The image capturing device captures at least an image of a periphery around the target finish point as peripheral information. The finish point shifting part shifts, on the basis of the peripheral information captured by the image capturing device, the target finish point set by the target locus setting part. The target locus resetting part resets the target locus to a target locus extending from the target start point set by the target locus setting part to a target finish point having been shifted by the finish point shifting part.

BRIEF DESCRIPTION OF DRAWINGS

FIG. 7 is a flowchart of a target locus changing process by the working machine in the first embodiment of the present invention.

DESCRIPTION OF EMBODIMENTS

Hereinafter, preferable embodiments of the present invention will be described with reference to the accompanying drawings.

Configuration of a Target Locus Setting System

Figure 1:
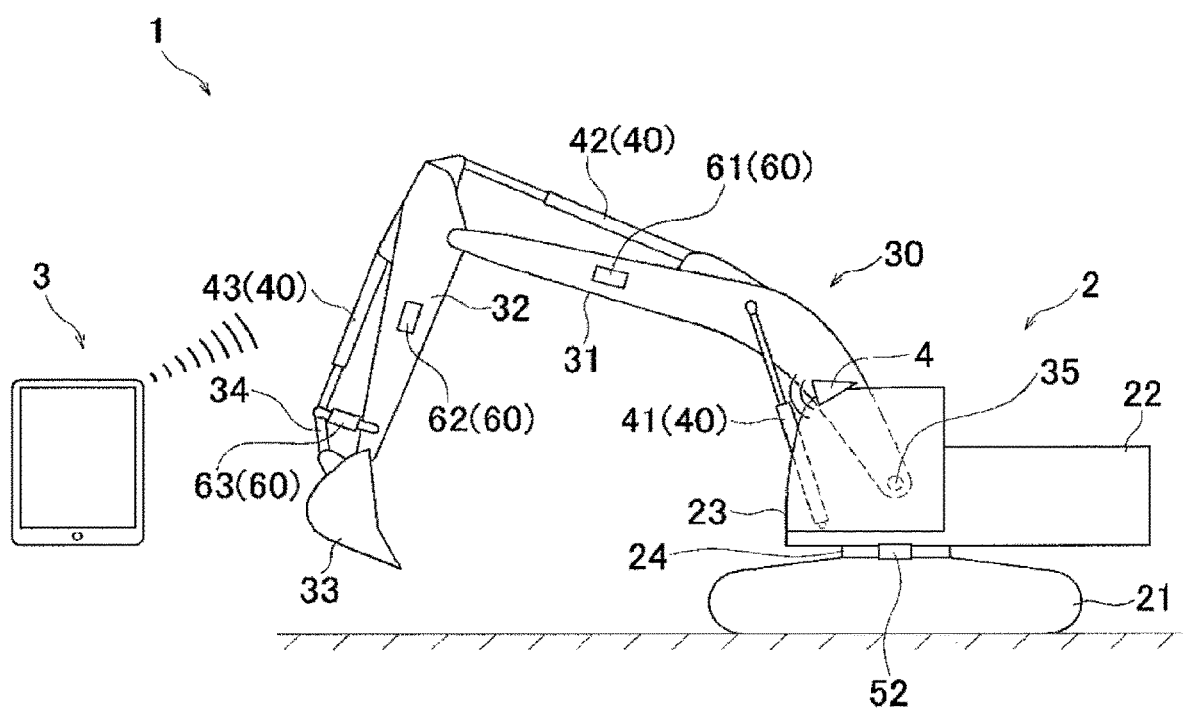
FIG. 1 is a configurational diagram of a target locus setting system according to a first embodiment of the present invention.

An attachment target locus setting system (target locus changing system) according to each of the embodiments of the present invention aims at setting and changing a target locus for a specific portion of an attachment included in a working machine. FIG. 1 is a configurational diagram of a target locus setting system 1 according to a first embodiment of the present invention. As shown in FIG. 1, the target locus setting system 1 includes: components included in a working machine 2; a mobile terminal 3; and an image capturing device 4. It is noted here that another target locus setting system 1 according to another embodiment may exclude the mobile terminal 3.

Configuration of the Working Machine

As shown in FIG. 1, the working machine 2 performs a work with an attachment 30 and, for example, serves as a hydraulic excavator. The working machine 2 includes a lower traveling body 21, an upper slewing body 22, a slewing device 24, the attachment 30, and cylinders 40.

The lower traveling body 21 causes the working machine 2 to travel, and includes, for example, a crawler. The upper slewing body 22 is slewably attached onto an upper portion of the lower traveling body 21. The upper slewing body 22 has a front portion provided with a cab (operator compartment) 23. The slewing device 24 enables the upper slewing body 22 to slew.

The attachment 30 is attached to the upper slewing body 22 rotatably in an up-down direction. The attachment 30 includes a boom 31, an arm 32, and a bucket 33. The boom 31 is attached to the upper slewing body 22 rotatably in the up-down direction. The arm 32 is attached to the boom 31 rotatably in the up-down direction. The bucket 33 is attached to the arm 32 rotatably in the up-down direction. The bucket 33 performs works including excavation, leveling, and scooping of a work target (soil and sand). The bucket 33 is an example of a leading end attachment to be attached to the atm 32. The leading end attachment is not limited thereto, and may be a nibbler or a clamp arm.

Each cylinder 40 enables the attachment 30 to rotate under a hydraulic pressure. Each cylinder 40 is a hydraulic extendable and contractable cylinder. The cylinders 40 include a boom cylinder 41, an arm cylinder 42, and a bucket cylinder 43.

The boom cylinder 41 drives the boom 31 rotatably with respect to the upper slewing body 22. The boom cylinder 41 has a proximal end rotatably attached to the upper slewing body 22. The boom cylinder 41 has a distal end rotatably attached to the boom 31.

The arm cylinder 42 drives the boom 31 rotatably with respect to the arm 32. The arm cylinder 42 has a proximal end rotatably attached to the boom 31. The arm cylinder 42 has a distal end rotatably attached to the arm 32.

The bucket cylinder 43 drives the bucket 33 rotatably with respect to the arm 32. The bucket cylinder 43 has a proximal end rotatably attached to the arm 32. The bucket cylinder 43 has a distal end rotatably attached to a link member 34 rotatably attached to the bucket 33.

The working machine 2 further has a manipulation lever 51 (see FIG. 2), an angle sensor 52, and a tilt angle sensor 60.

The manipulation lever 51 is manipulated by an operator to operate the stewing device 24 and the attachment 30. The manipulation lever 51 is provided in the cab 23.

The angle sensor 52 detects a slewing angle of the upper slewing body 22 to the lower traveling body 21. The angle sensor 52 includes, for example, an encoder, a resolver, or a gyro sensor. In the embodiment, the slewing angle of the upper slewing body 22 is defined as 0° when a frontward direction of the upper slewing body 22 and a frontward direction of the lower traveling body 21 agree with each other.

The tilt angle sensor 60 detects a posture of the attachment 30. The tilt angle sensor 60 includes a boom tilt angle sensor 61, an arm tilt angle sensor 62, and a bucket tilt angle sensor 63.

The boom tilt angle sensor 61 is attached to the boom 31 to detect a posture of the boom 31. The boom tilt angle sensor 61 acquires a tilt angle of the boom 31 to a horizontal line, and is, for example, a tilt (acceleration) sensor. The boom tilt angle sensor 61 may be a rotation angle sensor for detecting a rotation angle of a boom foot pin (boom proximal end) or a stroke sensor for detecting a stroke amount of the boom cylinder 41.

The arm tilt angle sensor 62 is attached to the arm 32 to detect a posture of the arm 32. The arm tilt angle sensor 62 acquires a tilt angle of the arm 32 to the horizontal line, and is, for example, a tilt (acceleration) sensor. The arm tilt angle sensor 62 may be a rotation angle sensor for detecting a rotation angle of an arm connection pin (arm proximal end) or a stroke sensor for detecting a stroke amount of the arm cylinder 42.

The bucket tilt angle sensor 63 is attached to the link member 34 to detect a posture of the bucket 33. The bucket tilt angle sensor 63 acquires a tilt angle of the bucket 33 to the horizontal line, and is, for example, a tilt (acceleration) sensor. The bucket tilt angle sensor 63 may be a rotation angle sensor for detecting a rotation angle of a bucket connection pin (bucket proximal end) or a stroke sensor for detecting a stroke amount of the bucket cylinder 43.

Configuration of the Mobile Terminal

As shown in FIG. 1, the mobile terminal 3 is manipulated by an operator or worker on a work site, and is, for example, a tablet terminal. The mobile terminal 3 is communicable with the working machine 2. It is noted here that the mobile terminal 3 may be a smartphone.

Configuration of the Image Capturing Device

As shown in FIG. 1, the image capturing device 4 can capture, as peripheral information, at least an image of a periphery around a target finish point to be described later. The image capturing device 4 is attached to the working machine 2 in the embodiment, but may be provided in a place (e.g., a specific area on the work site) away from the working machine 2. Moreover, the image capturing device 4 is a LIDAR in the embodiment, but may be a camera, an ultrasonic sensor, a millimeter-wave radar, a stereo camera, a distance image sensor, or an infrared sensor.

Circuitry Configuration of the Target Locus Setting System

Figure 2:
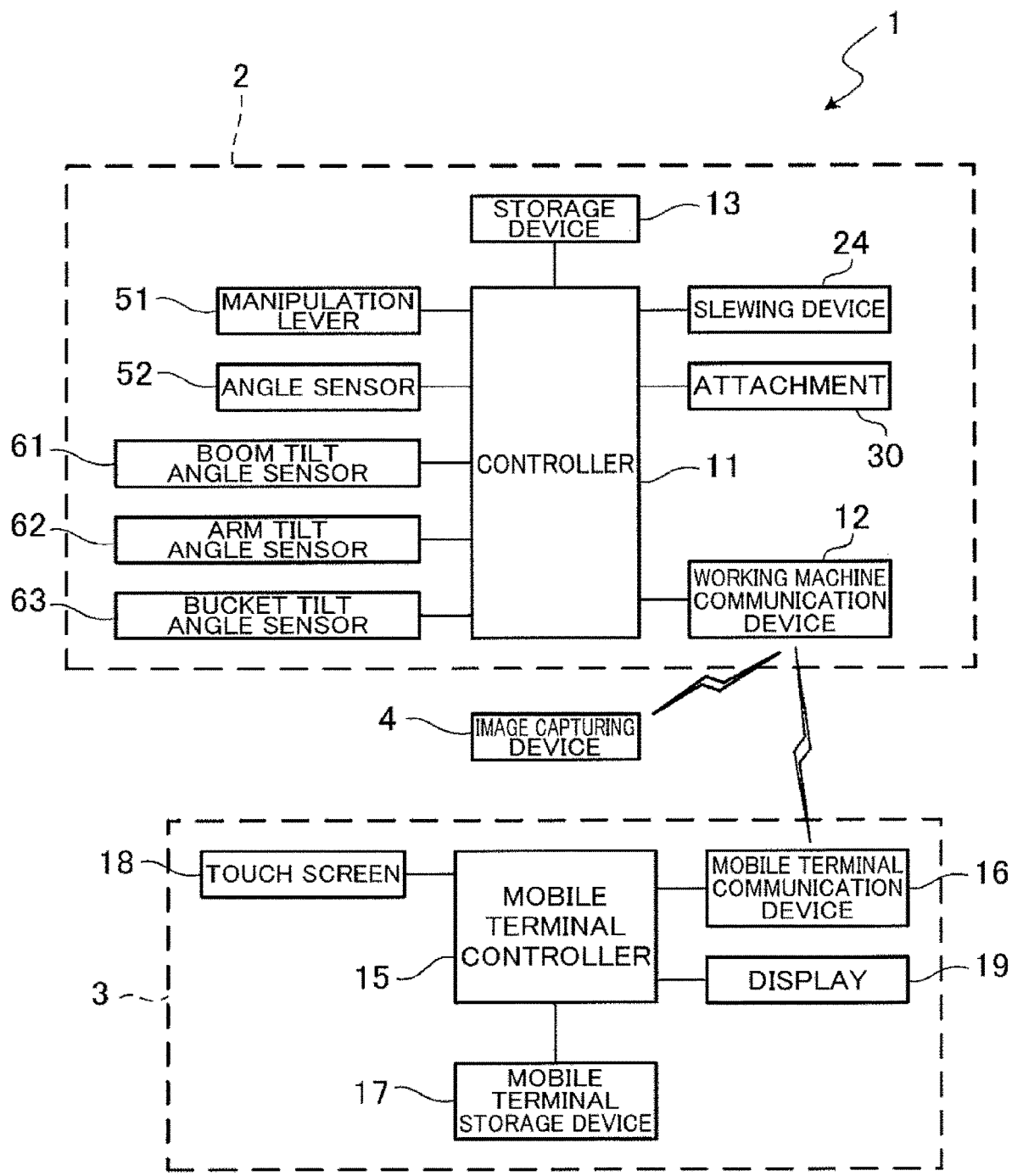
FIG. 2 is a block diagram of the target locus setting system according to the first embodiment of the present invention.

FIG. 2 is a block diagram of the target locus setting system 1. As shown in FIG. 2, the working machine 2 has a controller 11, a working machine communication device 12, and a storage device 13. These components form a part of the target locus setting system 1.

The controller 11 includes a CPU (Central Processing Unit), a ROM (Read Only Memory) which stores a control program, and a RAM (Random Access Memory) for use as a work area of the CPU. The controller 11 operably includes a target locus setting part, a finish point shifting part, a target locus resetting part, an obstacle specifying part, and a determination part of the present invention when the CPU executes the control program stored in the ROM.

The controller (target locus setting part) 11 sets a target start point and a target finish point for the distal end of the bucket 33 in a specific operation to be executed by the attachment 30, and further sets a target locus for the distal end of the bucket 33 from the target start point to the target finish point. Here, the target start point is a target point (a start point for a specific portion) where the attachment 30 starts an operation. Besides, the target finish point is a target point (a finish point for the specific portion) where the attachment 30 finishes the operation. The distal end of the bucket 33 is an example of the specific portion of the attachment 30. The specific portion of the attachment 30 is not limited thereto, and may be, for example, the distal end of the arm 32.

The controller 11 sets a target point at a specific interval on the target locus. In other words, the controller 11 sets one or more target points (target waypoints) each being a point over which the distal end of the bucket 33 passes on the target locus. Here, the specific interval may be a specific time interval or a specific distance interval. The time interval or the distance interval may be constant or set to change in accordance with a relation to the target start point and the target finish point.

Here, in the embodiment, teaching of causing the working machine 2 to actually operate attains setting of the target locus (online teaching). Specifically, the operator manipulates the manipulation lever 51 to operate the slewing device 24 and the attachment 30. The angle sensor 52 detects a slewing angle of the upper stewing body 22 at this time. Further, the tilt angle sensor 60 detects a posture of the attachment 30 at this time. The controller 11 sets the target locus on the basis of the detected slewing angle of the upper slewing body 22 and the detected posture of the attachment 30. The specific interval in this case indicates a sampling interval of a detected value from each of the angle sensor 52 and the tilt angle sensor 60.

The controller 11 may set the target locus when the controller 11 receives an input of information about the slewing angle of the upper slewing body 22 and information about the posture of the attachment 30 without causing the working machine 2 to actually operate (off-line teaching). In this case, the controller 11 may set the target locus when the controller 11 receives the input of information per specific interval.

Figure 3:
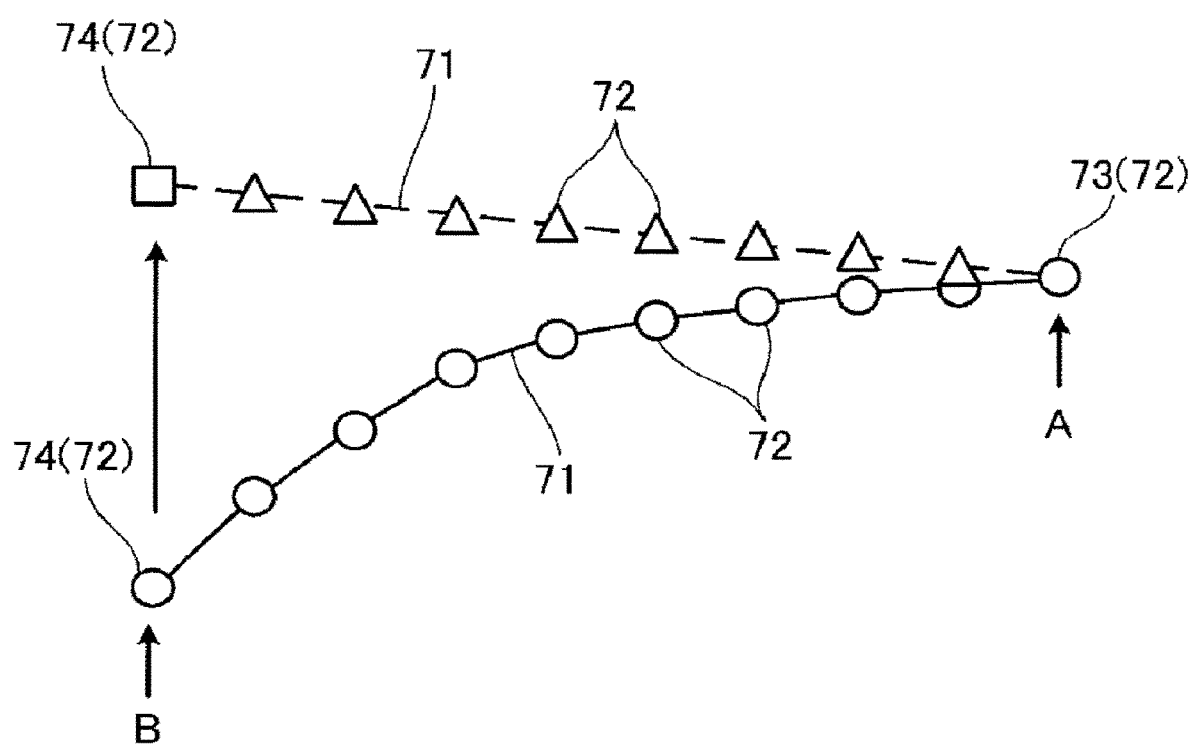
FIG. 3 illustrates a target locus for a distal end of a bucket included in a working machine in the first embodiment of the present invention, the target locus being reset to a target locus linearly extending.

FIG. 3 illustrates a target locus 71 for the distal end of the bucket 33 included in the working machine 2 in the embodiment. The target locus 71 in the embodiment is seen in return slewing. The return slewing represents an operation of causing the upper slewing body 22 to slew and returning the bucket 33 to the excavation point after discharging soil and sand held by the bucket 33. In FIG. 3, a target point 72 denoted by arrow A is defined as a target start point 73, and a target point 72 denoted by arrow B is defined as a target finish point 74. In the return slewing, the target start point 73 represents a soil discharge point, and the target finish point 74 represents the excavation point.

The target locus 71 for the distal end of the bucket 33 is not limited to the locus in the return slewing, but may be a locus in raising and slewing. The raising and slewing represents an operation of slewing the upper slewing body 22 in a state where the bucket 33 holds scooped soil and sand.

As described above, the image capturing device 4 captures the periphery around the target finish point 74 as peripheral information. The controller (finish point shifting part) 11 can shift, on the basis of the peripheral information captured by the image capturing device 4, the target finish point 74 set in the manner described above. For instance, the target finish point 74 serving as the excavation point is buried with soil and sand when the soil and sand is accumulated at the target finish point 74 by other working machine, or when the soil and sand is accumulated around the target finish point 74 and slid over the target finish point 74. In this case, the controller 11 shifts the target finish point 74 upward, that is, shifts the target finish point 74 to reach a ground surface. In FIG. 3, the target finish point 74 denoted by the mark "o" is shifted upward, and a target finish point 74 having been shifted is denoted by the mark "□".

The controller 11 may shift, on the basis of the peripheral information, the target finish point 74 downward, frontward, rearward, leftward, or rightward. For instance, when a level of the ground surface is lowered in accordance with the excavation, the controller 11 may shift the target finish point 74 serving as the excavation point to reach the lowered level of the ground surface. Moreover, when other working machine accumulates the soil and sand at a position closer to the working machine 2 than the target finish point 74, the controller 11 shifts the target finish point 74 serving as the excavation point frontward (to be closer to the working machine 2) to firstly excavate the accumulated soil and sand.

When the target finish point 74 is shifted, the controller (target locus resetting part) 11 resets the target locus 71 to a target locus extending from the target start point set in the manner described above to a target finish point having been shifted in a range from the target start point 73 to the target finish point 74. In FIG. 3, the reset target locus 71 is denoted by a dot line, and each target point 72 (target waypoint) on the target locus 71 is denoted by the mark "Δ".

Specifically, the controller 11 resets the target locus 71 to a target locus linearly distributing, when viewed in a certain direction, from the target start point to the target finish point having been shifted. In the embodiment, the target locus 71 is reset to the target locus linearly extending when viewed in a lateral direction of the working machine 2, but the target locus 71 may be reset to a target locus linearly extending viewed in an upward direction of the working machine 2 or a front-rear direction of the working machine 2.

From these perspectives, the target locus 71 for the distal end of the bucket 33 is set from the target start point 73 being the target point 72 where the attachment 30 starts an operation to the target finish point 74 being the target point 72 where the attachment 30 finishes the operation. Thereafter, the controller 11 shifts, on the basis of the peripheral information captured by the image capturing device 4, the target finish point 74. When the target finish point 74 is shifted, the target locus 71 is reset to a target locus in a range from the target start point 73 to the target finish point 74 having been shifted. When the target locus 71 is reset, the distal end of the bucket 33 operates to follow the target locus 71. The resetting of the target locus 71 in this way leads to achievement in efficient operation of the attachment 30.

Moreover, the controller 11 resets the target locus 71 to a target locus linearly extending when viewed in a certain direction. This resetting enables the attachment 30 to more efficiently operate than resetting of the target locus 71 to a target locus extending in a curve when viewed in the certain direction.

Figure 4:
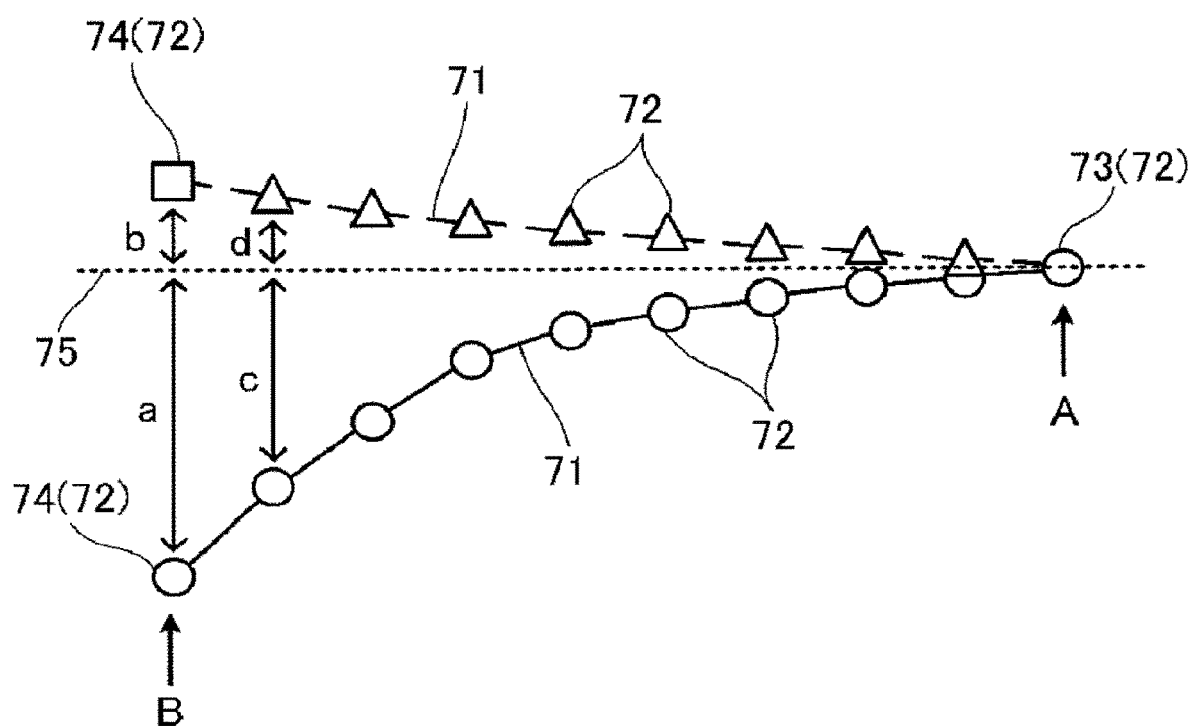
FIG. 4 illustrates a target locus for a distal end of a bucket included in a working machine in a second embodiment, the target locus being reset on the basis of a specific ratio.

FIG. 4 illustrates a target locus 71 for a distal end of a bucket 33 in a target locus setting system 1 according to a second embodiment of the present invention. As shown in FIG. 4, a controller 11 may reset the target locus 71 by shifting, on the basis of a ratio between a distance "a" from a reference line 75 to a target finish point 74 before the shifting by the controller 11 and a distance "b" from the reference line 75 to a target finish point 74 having been shifted by the controller 11, a target point 72 (target waypoint) falling within a range from a specific target point 72 to the target finish point 74. The reference line 75 is a straight line passing through the specific target point 72 and extends in a predetermined direction. The specific target point 72 represents a specific point among a target start point 73 and one or more target points 72 (target waypoints). In FIG. 4, the reference line 75 passes through the target start point 73 and extends in a horizontal direction. That is to say, the specific target point 72 in this case serves as the target start point 73. Hence, each target point 72 falling within the range from the target start point 73 to the target finish point 74 is shifted. The reference line 75 may extend in a direction other than the horizontal direction.

As shown in FIG. 4, when a distance from a target point 72 prior to the target finish point 74 before the shifting to the reference line 75 is denoted by "c", a distance "d" from a position of the target point 72 having been shifted to the reference line 75 is calculated as follows: $d=c \times b/a$. When the target locus 71 obtained before the shifting of the target finish point 74 forms a curve, a target locus 71 obtained after the shifting of the target finish point 74 also forms a curve.

Conclusively, each target point 72 falling within the range from the specific target point 72 to the target finish point 74 is shifted on the basis of the ratio between the distance "a" from the reference line 75 passing through the specific target point 72 and extending in the predetermined direction to the target finish point 74 before the shifting and the distance "b" from the reference line 75 to the target finish point 74 having been shifted. Consequently, the target locus 71 is reset. A shifted position of the target point 72 falling within the range from the specific target point 72 to the target finish point 74 is specifically determinable by employing the ratio.

Figure 5:
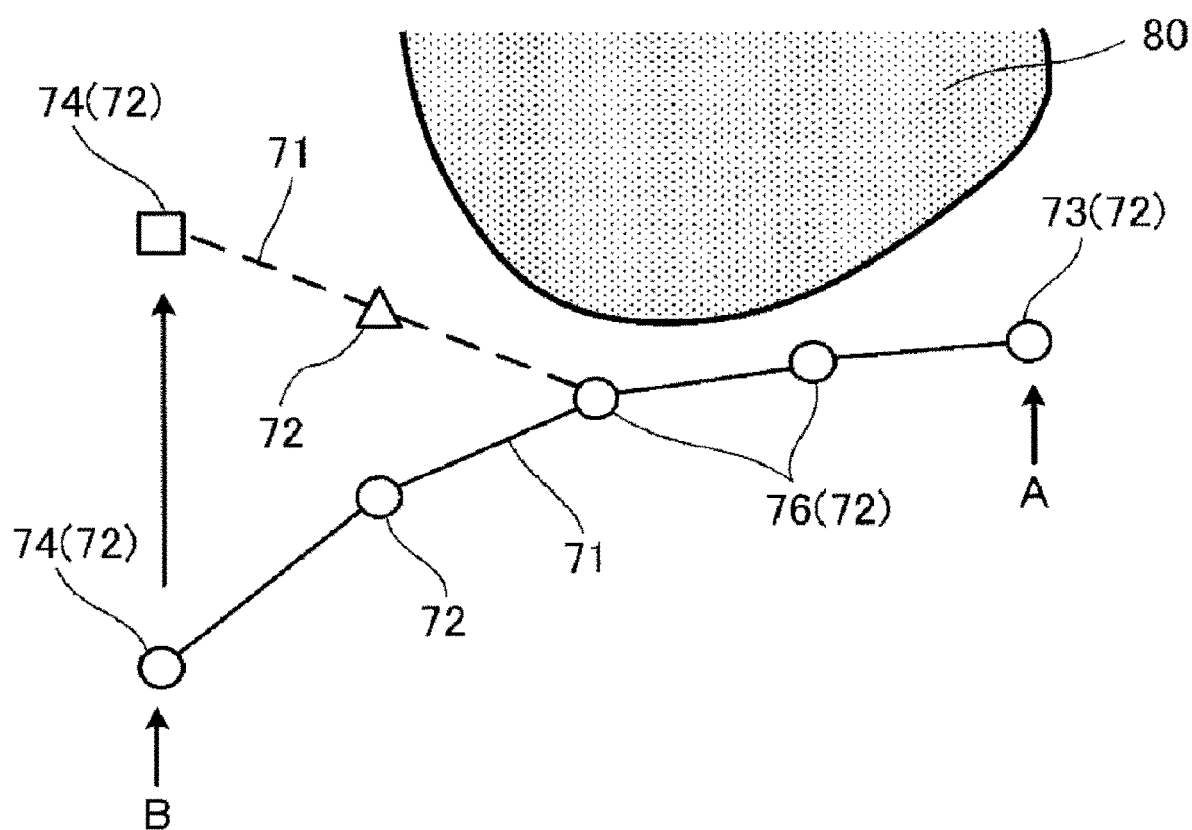
FIG. 5 illustrates a target locus for a distal end of a bucket included in a working machine in a third embodiment of the present invention where a fixed target point is set.

FIG. 5 illustrates a target locus 71 for a distal end of a bucket 33 in a target locus setting system 1 according to a third embodiment of the present invention. As shown in FIG. 5, a controller (target point setting part) 11 allows an operator to set, as a fixed target point 76, a target point 72 prohibited from being shifted among target points 72 except for a target finish point 74. As an example, a mobile terminal 3 is used to set the fixed target point 76. Specifically, the mobile terminal 3 has a display 19 which will be described later to display the target locus 71 and the target point 72 thereon. The operator manipulates a touch screen 18, which will be described later, of the mobile terminal 3 to set the fixed target point 76. From these perspectives, the mobile terminal 3 in the embodiment is operable as a fixed target point information input part for receiving information about one or more fixed target points 76 each being a target waypoint prohibited from being shifted by the controller 11 among one or more target waypoints.

For instance, the operator sets, as the fixed target point 76, a target point 72 causing a high possibility of contact with an obstacle 80 when shifted. In FIG. 5, a target point 72 adjacent to a target start point 73 and a target point 72 further adjacent to the adjacent target point are set as fixed target points 76.

The controller 11 then resets the target locus 71 by shifting at least one of the target points (target waypoints) falling within a range from a fixed target point 76 closest to the target finish point 74 among the one or more fixed target points 76 to a target finish point 74 having been shifted by the controller 11. In the embodiment, the controller 11 resets the target locus 71 to a target locus linearly extending when viewed in a lateral direction of the working machine 2.

As described with reference to FIG. 4, the controller 11 may reset the target locus 71 by using a ratio between a distance "a" from a reference line 75 to the target finish point 74 before the shifting and a distance "b" from the reference line 75 to the target finish point 74 having been shifted. In this case, the reference line 75 is set to pass through the fixed target point 76 closest to the target finish point 74 and extend in a predetermined direction. In other words, a specific target point 72 serves as the fixed target point 76 closest to the target finish point 74. Hence, the controller 11 shifts a target point 72 (one target point in FIG. 5) falling within the range from the fixed target point 76 closest to the target finish point 74 to the target finish point 74.

Conclusively, the operator sets, as the fixed target point 76, the target point 72 prohibited from being shifted among the target points 72 except for the target finish point 74. When the fixed target point 76 is set, the target locus 71 is reset to a target locus in the range from the fixed target point 76 closest to the target finish point 74 to the target finish point 74. In this manner, for example, the target locus 71 is resettable without shifting a target point 72 causing a high possibility of contact with the obstacle 80 when shifted.

Figure 6:
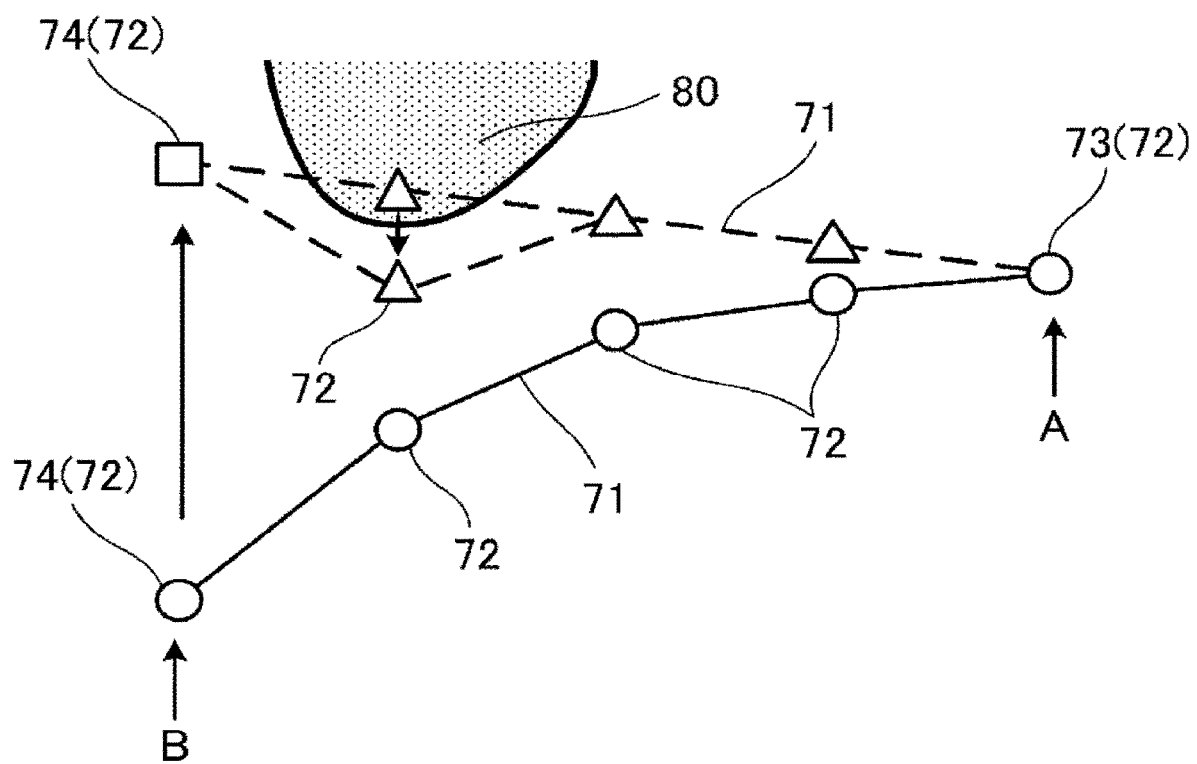
FIG. 6 illustrates a target locus for a distal end of a bucket included in a working machine in a fourth embodiment of the present invention where a target point closer to an obstacle is shifted.

Moreover, the image capturing device 4 can further capture, as attachment peripheral information (peripheral information), a periphery around a target locus (periphery around a region over which the attachment 30 passes). FIG. 6 illustrates a target locus 71 for a distal end of a bucket 33 included in a working machine 2 in a fourth embodiment of the present invention. A controller 11 (obstacle specifying part) can specify an obstacle having a possibility of coming into contact with an attachment 30 from peripheral information captured by an image capturing device 4. Besides, as shown in FIG. 6, the controller 11 may shift a target point 72 away from an obstacle 80 included in attachment peripheral information, the target point 72 being in target points 72 (target waypoints) on a reset target locus 71 at a distance of a predetermined value or smaller from the obstacle 80. In FIG. 6, a target point 72 adjacent to a target finish point 74 having been shifted is shifted away from the obstacle 80.

From these perspectives, when a target point 72 exists on a resultant reset target locus 71 at a distance of the predetermined value or smaller from the obstacle 80 included in the attachment peripheral information, the controller 11 shifts the target point 72 away from the obstacle 80. Consequently, the distal end of the bucket 33 can pass over a position away from the obstacle 80 when following the reset target locus 71.

Referring back to FIG. 2, the working machine communication device 12 is communicable with a mobile terminal communication device 16, which will be described later, of the mobile terminal 3. The storage device 13 can store a target locus and a target point set by the controller 11.

The controller 11 generates, on the basis of the target locus and the target point, an automatic operative instruction. The automatic operative instruction is an instruction of causing the slewing device 24 and the attachment 30 to automatically operate. The controller 11 then permits, on the basis of the automatic operative instruction, the slewing device 24 and the attachment 30 to automatically operate. The working machine 2 thus automatically operates in accordance with the automatic operative instruction.

As shown in FIG. 2, the mobile terminal 3 has a mobile terminal controller 15, the mobile terminal communication device 16, a mobile terminal storage device 17, the touch screen 18, and the display 19.

The mobile terminal communication device 16 is communicable with the working machine communication device 12 of the working machine 2. The mobile terminal controller 15 receives a target locus 71 and a target point 72 from the working machine 2 via the mobile terminal communication device 16. The display (display device) 19 includes a display screen image to display a reset target locus 71 thereon. Besides, the display 19 can display each target point 72 (a target start point, a target waypoint, a target finish point) on the display screen image. A display state on the display 19 is, for example, like the one shown in each of FIG. 3 to FIG. 6. This allows the operator to confirm the reset target locus 71 through the mobile terminal 3 located, for example, in a place away from the working machine 2.

The mobile terminal storage device 17 can store the target locus 71 and the target point 72 received from the working machine 2. The touch screen 18 receives an input from the operator. The touch screen 18 is an example of an input device. However, the input device is not limited thereto, and may include, for example, a keyboard. Specifically, the touch screen 18 serves as a target waypoint shifting part that receives an instruction of shifting a target waypoint. In particular, the touch screen 18 includes a touch screen-type input part provided on the display 19 for receiving the instruction so that the target waypoint displayed on the display screen image shifts on the display screen image in response to a manipulation by the operator.

The mobile terminal controller (target point shifting part) 15 shifts a target point 72 on the display screen of the display 19 in response to the manipulation by the operator. Specifically, the operator having confirmed the reset target locus 71 by viewing the display 19 touches a section on the touch screen where a target point 72 desired to be shifted is displayed by using a finger, and can shift the desired target point 72 by sliding the finger thereon. Target points 72 to be shifted may include the target start point 73 and the target finish point 74.

In conformity with a position of the target point 72 having been shifted by the operator on the display screen image after the resetting of the target locus 71, the controller 11 of the working machine 2 shifts a corresponding target point 72. Consequently, the reset target locus 71 is changed or modified. Specifically, the controller 11 modifies the target locus by further shifting the target point (target waypoint) indicated by the instruction in response to the instruction input to the touch screen 18 after the resetting of the target locus.

In this manner, the target point 72 is shifted on the display screen image on the display 19 in response to a manipulation by the operator. In conformity with a position of the target point 72 having been shifted on the display screen image after the recessing of the target locus 71, a corresponding target point 72 is shifted. The operator having confirmed the reset target locus 71 can modify the reset target locus 71 by shifting a desired target point 72. The modification may lead to achievement in more efficient operation of the attachment 30.

Besides, the operator can shift a desired target point 72 by manipulating the mobile terminal 3. Consequently, the mobile terminal 3 located, for example, in a place away from the working machine 2 enables the modification of the reset target locus 71.

Operation by the Target Locus Setting System

FIG. 7 is a flowchart of a target locus changing process in the first embodiment of the present invention. Next, an operation by the target locus setting system 1 will be described with reference to FIG. 7.

First, when the target locus change process is started, the controller 11 of the working machine 2 sets a target locus 71 (step S1). Next, the controller 11 allows an operator to set a fixed target point 76 (step S2). The operator sets the fixed target point 76 by using the mobile terminal 3. Subsequently, the controller 11 causes the image capturing device 4 to capture peripheral information (step S3).

Then, the controller 11 (deteimination part) determines whether to shift a target finish point 74 (step S4). At this time, the controller 11 determines whether soil and sand exists on the target finish point 74 with reference to the peripheral information captured by the image capturing device 4. It is determined that the target finish point 74 needs to be shifted when the soil and sand exists thereon. When the controller 11 determines not to shift the target finish point 74 in step S4 (NO in step S4), the flow is finished. Contrarily, when determining to shift the target finish point 74 (YES in step S4), the controller 11 (finish point shifting part) shifts the target finish point 74 (step S5), and resets the target locus 71 (step S6). Further, in step S5, the controller 11 shifts the target finish point 74 to a current level of the ground surface (ground surface of the soil and sand).

Subsequently, the controller 11 causes the image capturing device 4 to capture attachment peripheral information (step S7). Then, the controller 11 determines whether a target point 72 closer to an obstacle 80 exists on the reset target locus 71 (step S8). In step S8, when determining that such a target point 72 closer to the obstacle 80 exists (YES in step S8), the controller 11 shifts the relevant target point 72 away from the obstacle 80 (step S9) and proceeds to step S10.

Contrarily, when determining that no target point 72 closer to the obstacle 80 exists in step S8 (NO in step S8), the controller 11 proceeds to step S10.

In step S10, the controller 11 determines whether a target point 72 having been shifted by the operator on the mobile terminal 3 exists (step S10). The operator confirms the reset target locus 71, and shifts a target point 72 desired to be shifted by manipulating the mobile terminal 3 when the desired target point 72 is on the reset target locus.

When determining that the target point 72 having been shifted by the operator on the mobile terminal 3 exists in step S10 (YES in step S10), the controller 11 shifts a corresponding target point 72 on the target locus 71 (step S11) as well, and proceeds to step S12.

Contrarily, when determining that no target point 72 having been shifted by the operator on the mobile terminal 3 exists in step S10 (NO in step S10), the controller 11 proceeds to step S12.

In step S12, the controller 11 determines whether the operator instructs finish of modification of the target locus 71 (step S12). When determining that the operator does not instruct any finish of the modification of the target locus 71 in step S12 (NO in step S12), the controller 11 returns to step S10. Contrarily, when determining that the operator instructs the finish of the modification of the target locus 71 in step S12 (YES in step S12), the controller 11 stores contents of the modification in the storage device 13 (step S13), and the flow is finished.

(Effects)

As described heretofore, in the target locus setting system 1 according to each of the embodiments, the controller 11 sets a target locus 71 for the distal end of the bucket 33 from a target start point 73 being a target point 72 where the attachment 30 starts an operation to a target finish point 74 being a target point 72 where the attachment 30 finishes the operation. Thereafter, the controller 11 shifts, on the basis of peripheral information captured by the image capturing device 4, the target finish point 74, When the target finish point 74 is shifted, the controller 11 resets the target locus 71 to a target locus in a range from the target start point 73 to a target finish point 74 having been shifted. When the target locus 71 is reset, the distal end of the bucket 33 operates to follow the reset target locus 71. From these perspectives, the controller 11 permits the attachment 30 to efficiently operate by resetting the target locus 71 in accordance with a situation on a work site.

Further, the controller 11 resets the target locus 71 to a target locus linearly extending when viewed in a certain direction. This resetting enables the attachment 30 to more efficiently operate than resetting of the target locus 71 to a target locus extending in a curve when viewed in the certain direction.

Moreover, the controller 11 shifts a target point 72 falling within a range from a specific target point 72 to the target finish point 74 on the basis of a ratio between a distance "a" from the reference line 75 passing through the specific target point 72 and extending in a predetermined direction to the target finish point 74 before the shifting and a distance "b" from the reference line 75 to the target finish point 74 having been shifted. Consequently, the target locus 71 is reset. A shifted position of the target point 72 falling within the range from the specific target point 72 to the target finish point 74 is specifically determinable by employing the ratio.

Furthermore, the operator sets, as a fixed target point 76, a target point 72 prohibited from being shifted among target points 72 (the target start point and target waypoints) except for the target finish point 74. When the fixed target point 76 is set, the target locus 71 is reset to a target locus in a range from a fixed target point 76 closest to the target finish point 74 to the target finish point 74. In this manner, for example, the target locus 71 is resettable without shifting a target point 72 causing a high possibility of contact with the obstacle 80 when shifted.

When a target point 72 exists on a resultant target locus 71 reset by the controller 11 at a distance of a predetermined value or smaller from the obstacle 80 included in the attachment peripheral information, the controller 11 shifts the target point 72 away from the obstacle 80. Consequently, the distal end of the bucket 33 can pass over a position away from the obstacle 80 when following the reset target locus 71.

In each of the embodiments, the reset target locus 71 is displayed on the display screen image on the display 19. Hence, the operator having viewed the display screen image on the display 19 can confirm the reset target locus 71.

The target point 72 is shifted on the display screen image on the display 19 in response to a manipulation by the operator. In conformity with a position of the target point 72 having been shifted on the display screen image after the resetting of the target locus 71, the controller 11 shifts a corresponding target point 72. The operator having confirmed the reset target locus 71 can modify the reset target locus 71 by shifting a desired target point 72. The modification may lead to achievement in more efficient operation of the attachment 30.

Further, the reset target locus 71 is displayed on the mobile terminal 3. In this manner, the mobile terminal 3 located, for example, in a place away from the working machine 2 enables confirmation of the reset target locus 71. The operator shifts a desired target point 72 by manipulating the mobile terminal 3. Accordingly, the operator can modify the reset target locus 71 through the mobile terminal 3 located, for example, in a place away from the working machine 2. The operator may shift the desired target point 72 through another device in place of the mobile terminal 3.

Conclusively, the embodiments of the present invention are described heretofore, but are merely described as examples without particularly limiting the present invention. It is the matter of design choice for changes in the details of the configuration. Furthermore, the operations and effects described in the embodiments of the present invention are merely listed as optimal operations and effects attained by the present invention, and thus should not be limited thereto.

For instance, although the controller 11 of the working machine 2 sets a target locus 71 and resets the target locus 71 by shifting a target finish point 74 on the basis of peripheral information in the embodiment, a controller or software included in an unillustrated server may execute the setting and resetting. Specifically, the target locus setting system according to the present invention is not limited to the one at least a part of which is mounted on the working machine, and may be any system for use in the working machine. Similarly, the server, in place of the operator, may set a fixed target point 76.

Although the display 19 of the mobile terminal 3 is described as the display device in the embodiment, the display device may be a display device provided in the cab 23 of the working machine 2, or a monitor connected to an unillustrated server. Further, the operator may modify the target locus by using an input device provided in the cab 23 of the working machine 2 or a server without limitation to the modification using the mobile terminal 3.

Provided by the present invention is an attachment target locus setting system for use in a working machine including a lower traveling body, an upper slewing body slewably attached onto the lower traveling body, and an attachment attached to the upper slewing body. The target locus setting system includes a target locus setting part, an image capturing device, a finish point shifting part, and a target locus resetting part. The target locus setting part sets a target start point being a start point for a specific portion of the attachment in a specific operation to be executed by the attachment, a target finish point being a finish point for the specific portion in the specific operation, and a target locus being a locus for the specific portion from the target start point to the finish point. The image capturing device captures at least an image of a periphery around the target finish point as peripheral information. The finish point shifting part shifts, on the basis of the peripheral information captured by the image capturing device, the target finish point set by the target locus setting part. The target locus resetting part resets the target locus to a target locus extending from the target start point set by the target locus setting part to a target finish point having been shifted by the finish point shifting part.

According to the present invention, the target locus for the specific portion of the attachment is set from the target start point being the target point where the attachment starts the operation to the target finish point being the target point where the attachment finishes the operation. Thereafter, the target finish point is shifted on the basis of the peripheral information captured by the image capturing device. When the target finish point shifted, the target locus is reset to a target locus in a range from the target start point to the target finish point having been shifted. When the target locus is reset, the specific portion of the attachment operates to follow the target locus. From these perspectives, the target locus is resettable in accordance with the peripheral information even when a shape or contour of a soil surface on a work site changes every moment, and therefore, the attachment is efficiently operable.

In this configuration, the target locus resetting part may reset the target locus to a target locus linearly distributing, when viewed in a certain direction, from the target start point set by the target locus setting part to the target finish point having been shifted by the finish point shifting part.

In this configuration, the target locus setting part may set one or more target waypoints each being a point over which the specific portion passes on the target locus. The target locus resetting part may reset the target locus by allowing a straight line passing through the target start point and a specific target point among the one or more target waypoints and extending in a predetermined direction to be defined as a reference line, and shifting, on the basis of a ratio between a distance from the reference line to the target finish point before the shifting by the finish point shifting part and a distance from the reference line to the target finish point having been shifted by the finish point shifting part, at least one of the target waypoints falling within a range from the specific target point to the target finish point having been shifted.

In this configuration, the target locus setting part may set one or more target waypoints each being a point over which the specific portion passes on the target locus. This configuration may further include a fixed target point information input part that receives information about one or more fixed points each being a target waypoint prohibited from being shifted by the target locus resetting part among the one or more target waypoints. The target locus resetting part may reset the target locus by shifting at least one of the target waypoints falling within a range from a fixed target point closest to the target finish point among the one or more fixed target points to the target finish point having been shifted by the finish point shifting part.

In this configuration, the target locus setting part may set one or more target waypoints each being a point over which the specific portion passes on the target locus. The image capturing device may further capture an image of a periphery around the target locus as the peripheral infoiiiiation. This configuration may further include an obstacle specifying part that specifies an obstacle having a possibility of coming into contact with the attachment from the peripheral information captured by the image capturing device. The target locus resetting part may reset the target locus by shifting at least a part of the target waypoints falling within a range from the target start point to the target finish point, and further shift a target waypoint away from the obstacle, the target waypoint being in the target points on the reset locus at a distance of a predetermined value or smaller from the obstacle.

This configuration may further include a display device having a display screen image to display the reset target locus.

In this configuration, the target locus setting part may reset one or more target waypoints each being a point over which the specific portion passes on the target locus. The target locus resetting part may reset the target locus by shifting at least a part of the target waypoints falling within a range from the target start point to the target finish point. The display device may display the target waypoint having been shifted by the target locus resetting part on the display screen. This configuration may further include a target waypoint shifting part that receives an instruction of shifting the target waypoint. The target locus resetting part may modify the target locus by further shifting the target waypoint indicated by the instruction in response to the instruction input to the target waypoint shifting part after the resetting of the target locus.

In this configuration, the target waypoint shifting part may include a touch screen-type input part provided on the display device for receiving the instruction so that the target waypoint displayed on the display screen image shifts on the display screen image in response to a manipulation by an operator. The target locus resetting part may modify the target locus by further shifting the target waypoint shifted on the display screen image through the touch screen-type input part after the resetting of the target locus.

This configuration may further include a mobile terminal communicable with the working machine. The display device and the target point shifting part may be arranged in the mobile terminal.

The invention claimed is:

1. An attachment target locus setting system for use in a working machine including a lower traveling body, an upper slewing body slewably attached onto the lower traveling body, and an attachment attached to the upper slewing body, the attachment target locus setting system comprising:
    a target locus setting part that sets a target start point being a start point for a specific portion of the attachment in a specific operation to be executed by the attachment, a target finish point being a finish point for the specific portion in the specific operation, and a target locus being a locus for the specific portion from the target start point to the finish point;
    an image capturing device that captures at least an image of a periphery around the target finish point as peripheral information;
    a finish point shifting part that shifts, based on the peripheral information captured by the image capturing device, the target finish point set by the target locus setting part; and
    a target locus resetting part that resets the target locus to a target locus extending from the target start point set by the target locus setting part to a target finish point having been shifted by the finish point shifting part, wherein
    the target locus setting part sets one or more target waypoints each being a point over which the specific portion passes on the target locus, and
    the target locus resetting part resets the target locus by allowing a straight line passing through the target start point and a specific target point among the one or more target waypoints and extending in a predetermined direction to be defined as a reference line, and shifting, on the basis of a ratio between a distance from the reference line to the target finish point before the shifting by the finish point shifting part and a distance from the reference line to the target finish point having been shifted by the finish point shifting part, at least one of the target waypoints falling within a range from the specific target point to the target finish point having been shifted.

2. An attachment target locus setting system for use in a working machine including a lower traveling body, an upper slewing body slewably attached onto the lower traveling body, and an attachment attached to the upper slewing body, the attachment target locus setting system comprising:
    a target locus setting part that sets a target start point being a start point for a specific portion of the attachment in a specific operation to be executed by the attachment, a target finish point being a finish point for the specific portion in the specific operation, and a target locus being a locus for the specific portion from the target start point to the finish point;
    an image capturing device that captures at least an image of a periphery around the target finish point as peripheral information;
    a finish point shifting part that shifts, on the basis of the peripheral information captured by the image capturing device, the target finish point set by the target locus setting part; and
    a target locus resetting part that resets the target locus to a target locus extending from the target start point set by the target locus setting part to a target finish point having been shifted by the finish point shifting part, wherein
    the target locus setting part sets one or more target waypoints each being a point over which the specific portion passes on the target locus, the attachment target locus setting system further comprising:
    a fixed target point information input part that receives information about one or more fixed points each being a target waypoint prohibited from being shifted by the target locus resetting part among the one or more target waypoints, wherein
    the target locus resetting part resets the target locus by shifting at least one of the target waypoints falling within a range from a fixed target point closest to the target finish point among the one or more fixed target points to the target finish point having been shifted by the finish point shifting part.

3. An attachment target locus setting system for use in a working machine including a lower traveling body, an upper slewing body slewably attached onto the lower traveling body, and an attachment attached to the upper slewing body, the attachment target locus setting system comprising:
    a target locus setting part that sets a target start point being a start point for a specific portion of the attachment in a specific operation to be executed by the attachment, a target finish point being a finish point for the specific portion in the specific operation, and a target locus being a locus for the specific portion from the target start point to the finish point;
    an image capturing device that captures at least an image of a periphery around the target finish point as peripheral information;

a finish point shifting part that shifts, on the basis of the peripheral information captured by the image capturing device, the target finish point set by the target locus setting part;

a target locus resetting part that resets the target locus to a target locus extending from the target start point set by the target locus setting part to a target finish point having been shifted by the finish point shifting part; and a display device having a display screen image to display the reset target locus, wherein the target locus setting part sets one or more target waypoints each being a point over which the specific portion passes on the target locus, the target locus resetting part resets the target locus by shifting at least a part of the target waypoints falling within a range from the target start point to the target finish point, and the display device displays the target waypoint having been shifted by the target locus resetting part on the display screen, the attachment target locus setting system further comprising:

a target waypoint shifting part that receives an instruction of shifting the target waypoint, wherein the target locus resetting part modifies the target locus by further shifting the target waypoint indicated by the instruction in response to the instruction input to the target waypoint shifting part after the resetting of the target locus.

4. The attachment target locus setting system according to claim 3, wherein the target waypoint shifting part includes a touch screen-type input part provided on the display device for receiving the instruction so that the target waypoint displayed on the display screen image shifts on the display screen image in response to a manipulation by an operator, and the target locus resetting part modifies the target locus by further shifting the target waypoint shifted on the display screen image through the touch screen-type input part after the resetting of the target locus.

5. The attachment target locus setting system according to claim 3, further comprising a mobile terminal communicable with the working machine, wherein the display device and the target point shifting part are arranged in the mobile terminal.

* * * * *